United States Patent [19]

Shimada

[11] Patent Number: 4,866,667
[45] Date of Patent: Sep. 12, 1989

[54] SWITCHING DEVICE FOR A PLURALITY OF RS232C INTERFACES

[75] Inventor: Toshio Shimada, Kanagawa, Japan

[73] Assignee: Technopark Mine Co., Ltd., Tokyo, Japan

[21] Appl. No.: 130,596

[22] Filed: Dec. 8, 1987

Related U.S. Application Data

[63] Continuation-in-part of Ser. No. 705,339, filed as Pct JP84/00324 on Jun. 21, 1984, published as WO85/0260 on Jan. 17, 1985, agandoned.

[30] Foreign Application Priority Data

Jun. 23, 1983 [JP] Japan ............................ 58-114008
Jun. 21, 1984 [WO] PCT Int'l Appl. ... PCT/JP84/00324

[51] Int. Cl.$^4$ .............................................. G06F 3/00
[52] U.S. Cl. ................................. 364/900; 364/929.1; 364/940.4
[58] Field of Search ... 364/200 MS File, 900 MS File; 370/53, 54, 96

[56] References Cited

U.S. PATENT DOCUMENTS

| 3,668,649 | 6/1972 | Pedersen et al. | 364/200 |
| 4,100,601 | 7/1978 | Kaufman et al. | 364/200 |
| 4,177,511 | 12/1979 | Taddei | 364/200 |
| 4,584,680 | 4/1986 | Carter et al. | 370/96 |
| 4,638,422 | 1/1987 | Rees | 364/200 |

*Primary Examiner*—Thomas M. Heckler
*Attorney, Agent, or Firm*—Cushman, Darby & Cushman

[57] ABSTRACT

A selector box for switching between RS232 ports is disclosed. A single host terminal is provided and a plurality of channel terminals are provided. In a first mode, a command comes from the host terminal determining which of the channel terminals the host terminal will be connected to. In a second mode, the command comes from a channel terminal requesting access to the host terminal. The device can also be operated in a manual mode where a manual switch performs the connecting function. In the first mode the signal commanding the channel number is part of the transmit data signal of an RS232 interface. In the second mode, the various RS232 interfaces of the channel terminals are all scanned and the first channel to produce a certain signal receives access to the host terminal.

22 Claims, 7 Drawing Sheets

SWITCHING DEVICE FOR A PLURALITY OF RS232C INTERFACES

This application is a continuation-in-part of application Ser. No. 705,339 filed as Pct JP84/00324 on Jun. 21, 1984, published as WO85/00260 on Jan. 17, 1985, now abandoned.

FIELD OF THE INVENTION

This invention relates to a selector switch box for switching signals in a data communication system. More specifically, the present invention relates to a selector switch box for use with an RS232C asynchronous system which switches between a host and a plurality of channels based on a command from either the host, one of the channels, or from an external source.

BACKGROUND AND SUMMARY OF THE INVENTION

Asynchronous systems have been widely used in recent years for many purposes, including communication between a computer and peripheral devices. One prevalent use has been in communication with a computer of relatively low processing capability, known as a personal computer. Such a personal computer typically includes hardware such as a microprocessor, and its own software. It is desirable in certain applications to enable this computer to selectively communicate with one of a plurality of devices. A device which does this is known as a multiplexer.

However, the only stand-alone general purpose multiplexers which have been previously used, have been systems in which a communication with an external device could only occur based on a manual command. Therefore, to use such a multiplexer, the user of the computer would have to manually switch a switch command device to connect the computer to the desired peripheral device. Although there have been some multiplexers in the prior art which performed automatic switching functions, these multiplexers have typically been incorporated in a computer or in other such devices, and have not been independent general purpose units.

Moreover, a desirable conventional system includes many peripheral devices connected to a computer. Printers and CRT terminals are typical examples of such devices. Other such devices include modems, testers for performing Go/No Go tests using a microprocessor carrier board, an adapter for allowing the personal computer to be used as a logic analyzer, and the like. Therefore, personal computers have been increasingly interfaced with such peripheral devices.

In addition, there has been a demand in recent years for a polling-type connection to such devices. Such a polling connection would enable a peripheral device, such as a printer, to operate in a polling mode. In this mode of operation, the computer could send enough information to the print buffer of the printer to enable the printer to print. Another transmission to the print buffer could be requested by the printer after it has printed the contents. The general purpose type multiplexers of the prior art cannot perform such a function.

To meet the above objects and to overcome all the problems which have existed in the prior art, the present invention describes a general purpose device with a highly configurable selector switch box. This box is usable for connection between devices of a system such as described above. The device is adapted to be connected between a first terminal that comprises an RS232C interface. A plurality N of second terminals are also provided, each of which also includes an RS232C interface. Each of the second terminals, as well as the first terminal, is connected to a switching circuit. This switching circuit performs the function of selectively connecting at least one of the second terminals to the first terminal.

A command analyzing circuit is also connected to the first terminal. This command analyzing circuit receives one of the RS232 signal lines from the command analyzing circuit. Typically, the signal which would be received is the data terminal ready (DTR) signal or the request to send (RTS) signal. After receiving DTR or RTS, the command analyzer receives a channel designation number and/or a polling mode number contained within the data on the transmit data (TXD) line.

The output of the command analyzing circuit is therefore a specific channel designation including either a mode number or a polling mode number. The output of this signal is coupled to an auto/manual circuit. This auto/manual circuit is a switch which enables one of two input signals to be switched t its output. One of the input two signals is the channel designation number from the command analyzer. At the other input, the auto/manual switch receives an output from a manual channel select switch. This manual channel select switch enables a manual control of such channel selecting.

The output of the auto/manual switch is connected to a decoder which translates the parallel format command signal to a plurality of discrete output signals. These discrete output signals are connected either to the connecting circuit (via an OR gate discussed later) or to a scanning circuit.

The scanning circuit is also connected to the RS232 signals from each of the second terminals. The scanning circuit is responsive to an output from the decoding circuit, and polls signals from the second terminals in response to an appropriate output from the decoding circuit. The typical signals which would be polled are the data set ready (DSR) signal and the carrier detect (CD) signal. The output of the polling circuit is another channel designation number, representing a number of the channel found active during polling. The channel designation number from the decoder and from the polling circuit are both connected to OR gate 36. When either one of these signals is present, the connecting circuit is commanded to make an appropriate connection.

A baud rate generator 32 is also provided for clocking and synchronizing the entire system.

The invention is advantageous for the following reasons. Since the device is compact and integrally constructed, and uses general purpose type interfaces, it can be applied to a large number of devices. Due to its ability to be structured in a single box and switchable based on a command from an external terminal, less user intervention is required. Switching control can be conducted either manually or automatically. The circuit construction is relatively simple. Furthermore, the device can be easily made using standard available TTL type logic or the like, and can be used for a number of purposes.

BRIEF DESCRIPTION OF THE DRAWINGS

An exemplary and presently preferred embodiment of the invention will be described in detail with reference to the accompanying drawings wherein.

DESCRIPTION OF THE PREFERRED EMBODIMENT

A presently preferred embodiment of the invention will now be described in detail with reference to the accompanying drawings.

Figure 1:
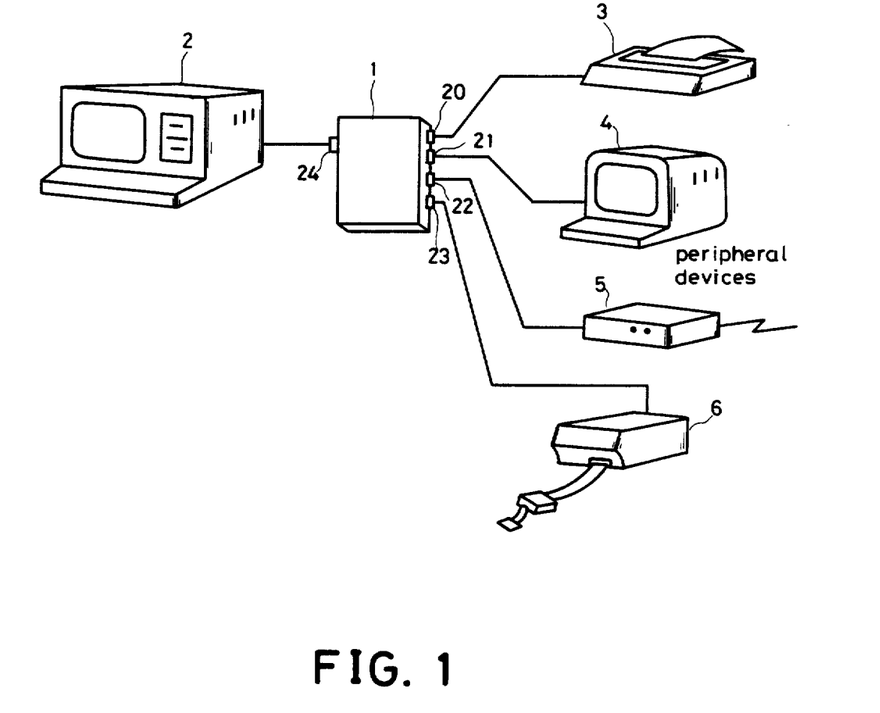
FIG. 1 shows the selector switch box connected between a personal computer as the host terminal and a plurality of peripheral devices.

FIG. 1 shows a schematic view of the embodiment of the system using the selector switch box according to the present invention. FIG. 1 shows selector switch box 1 connected between host computer 2 and a plurality of peripheral devices 3, 4, 5 and 6. Host computer 2 is connected to host side terminal 24 of selector switch box 1. The channel side of selector switch box 1 has four outputs—20, 21, 22 and 23—in this embodiment. Output 20 is shown connected to a printer 3. Output 21 is shown connected to CRT 4, output 22 is shown connected to modem 5 and output 23 is shown connected to tester 6.

Figure 2:
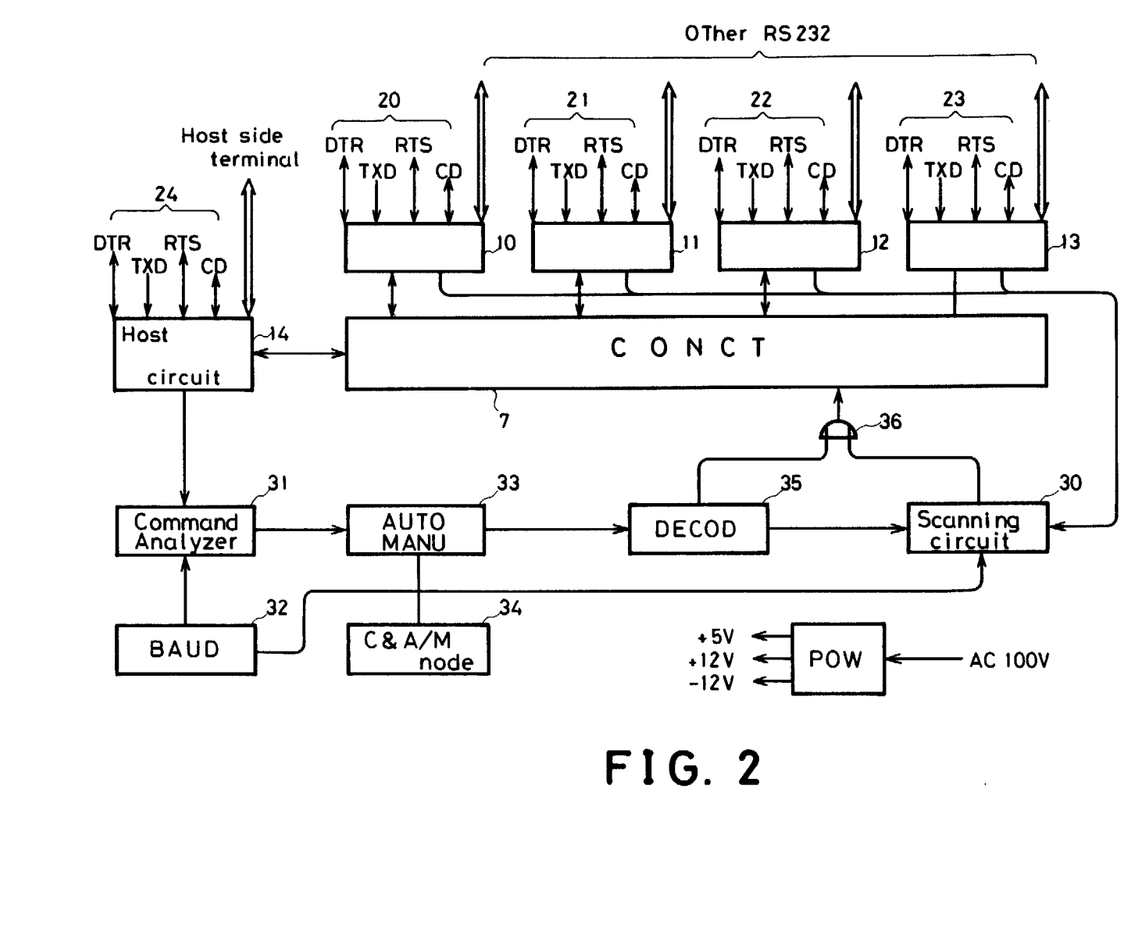
FIG. 2 shows, a block diagram of the selector switch box.

FIG. 2 shows a block diagram of an embodiment of selector switch box 1 constructed according to the present invention. This block diagram will be discussed in more detail throughout this specification.

Host side terminal 24 is shown in FIG. 2 as being connected to all the respective signals of an RS232C interface. These signals are known to those having ordinary skill in the art. These signals include:

transmit data (TXD);
receive data (RXD);
request to send (RTS);
clear to send (CTS);
data set ready (DSR);
signal ground (SG);
data terminal ready (DTR); and
carrier detect (CD).

All of these signals, as part of the RS232 signal, are connected to host side terminal 24. Host side terminal 24 is first connected to the host terminal circuit 14. Host terminal circuit 14 includes a plurality of line drivers/line receivers, each respectively connected to one of the RS232C signals.

This embodiment uses TTL (transistor-transistor logic) for the logic functions performed by the structure of FIG. 2. Accordingly, the line receiver/line drivers are of a type which receives a RS232 level on one end and converts to a TTL level on the other end.

One output of host terminal circuit 14 is connected to connecting circuit 7 which will be discussed later. Another output of host terminal circuit 14 is connected to command analyzer 31. This other output connects appropriate RS232 signals (now at TTL level) to the command analyzer for further use within the circuit.

Connecting circuit 7 is also connected to terminal circuits 0-3. Each of these terminal circuits receives an RS232 signal from an associated peripheral device. These RS232 signals are line received/line driven and are transformed to a TTL voltage level which is coupled to connecting circuit 7. Therefore, it can be seen that connecting circuit 7 receives the RS232 signals from all of the host terminal and the channel terminals. The RS232C signal of TTL level from terminal circuits 0-3 are also connected to scanning circuit 30, which will be discussed later.

Connecting circuit 7 has the function of selectively connecting at least one of the channel circuits to the host circuit, To this end, connecting circuit 7 includes a plurality of interconnected tri-state type buffers. The respective inputs and outputs of these buffers/receivers are wire OR'ed together. One set of buffers is enabled at any given time. That enabled set becomes active—providing a path between the enabled set of outputs and the host circuit. All the nonenabled buffers remain in tristate, presenting a high output impedance. The one of the sets of tri-state buffers which is enabled is controlled by an external signal.

This system is so configured that it can operate in either of an automatic or a manual mode. In a manual mode, a command is manually entered to represent which of the channel circuits should connect to the host circuit. This command will be typically made by a user, and uses a selectable multiple-switch circuit in this embodiment. In addition, the present invention operates in a first and a second mode in each of the auto and the manual modes. In the first mode, the channel among the channel side terminals which is to be connected is commanded from the host side terminal. In the second mode, the channel which is to be connected is commanded by the channel side circuits themselves. These modes and this operation will be discussed in more detail througout this specification. The initial operation, however, will be concerned with the first mode.

In the first mode, the command to be analyzed is received from the host side terminal 24 and host side terminal circuit 14. In operation, the command analyzer receives the transmit data TXD among the RS232 signals. Immediately after a time when the host side terminal data terminal ready signal goes from OFF to ON (becomes active), the channel number data to be selected is received on the TXD or transmit data signal line. This data may be in either ASCll or JIS code, for example. The command analyzing circuit 31 analyzes the transmit data signal, which may comprise a start bit, between 5 and 8 data bits, a parity check code, and one to two stop bits. This data is converted to a channel data of three parallel bits. Therefore, the command analyzer 31 comprises a serial to parallel converter. In this embodiment, this is performed by a serial-in parallel-out shift register.

Therefore, the output from command analyzer 31 is a parallel, 3-bit signal, indicative of a commanded channel. This is one input to auto/manual switch 33.

The other input to auto/manual switch 33 is received from channel select switches 34. These channel select switches also provide a 3-bit manually selectable input to auto/manual switch 33.

Auto/manual switch 33 typically comprises a data selector/multiplexer. The A inputs of the data selector/multiplexer are connected to the output of command analyzer 31, with the B inputs connected to the channel selector 34. The auto/manual command switch 33 commands which of the A or B inputs are coupled to the output.

Regardless of which input is coupled to the output, the output of auto/manual switch 33 is coupled to decoder 35. Decoder 35 decodes the 3-bits of channel data. Since 3-bits corresponds to $2^3 = 8$ possible command signals, decoder 35 is typically a 3 to 8 converter. Based on the three input signals, decoder 35 produces 8 discrete output lines.

Four of these lines are coupled to connecting circuit 7 through OR gate 36.

Therefore, in the first mode, where the commands come from the host side terminal, the signals to command connecting circuit 7 come from decoder 35 through OR gate 36 and in response command the connection of channel circuits 20, 21, 22 and 23. When switching is completed in the circuit, the connection between the devices of the host side terminal and the devices of the channel terminals that are selected, are completed.

An example of the program to generate said command in a BASIC program for very popular personal computers is shown below.

```
OPEN *COM : N81NS *AS #1
PRINT #1, *1, *1 :
CLOSE #1
```

This switching is completed in the present invention in 11 bits after the start bit of the channel data is received by the decoder.

In order to release the connection which has been previously made, computer 2, attached to the host terminal circuit 24, must again alter the data terminal ready DTR signal from ON to OFF (inactive). The command analyzing circuit 31 provides a control signal corresponding to this transition of the data terminal ready signal. The decoder receives this control signal and appropriately actuates the switching circuit to complete the releasing operation.

If the switching circuit 33 is in manual mode, the channel data corresponding to the channel number selected by channel selecting circuit 34 will be provided to connecting circuit 7.

A broadcast mode is also possible. When the channel selected is, for instance, channel [4], a command is sent to activate the switching circuit 7 to connect all of the devices connected to the channel terminals 20, 21, 22, and 23 to host terminal 24. This enables general transmission.

As discussed above, the present embodiment provides a 3-bit input to the decoder 35, which in turn produces 8 output signals. Only 4 of these output signals are used to command connecting circuit 7. These output signals are called channel 0, channel 1, channel 2 and channel 3. Another signal (broadcast) commands broadcast mode. Other signals are provided to command scanning circuit 30.

The above discussed second mode is commanded by one of these other signals. If the signal from transmit data (TXD) line indicates channel [5], for instance, decoder 35 feeds a polling mode signal to scanning circuit 30. Scanning circuit 30 is in turn activated by this signal.

In response to the polling mode 5, the scanning circuit 30 begins monitoring the data set ready signals (DSR) from the respective channel side circuits 10–13. When one of the data set ready signals from the channel side terminal circuit turns ON (active), scanning circuit 30 transmits a channel switching signal corresponding to the channel number of the channel on which this transition is detected by scanning circuit 30. This channel number is OR'ed with the channel number from decoder 35 and connected to connecting circuit 7. Therefore, the polling mode allows the circuits connected to channel circuits 10, 11, 12 and 13 to themselves command a switch to that channel. In response, switching circuit 7 connects the selected channel to the host side terminal 14. When the data set ready signal of that respective channel turns off, the scanning circuit 30 detects this and turns off the respective channel side circuit. When a channel among the channel side terminal circuits 10–13 again undergoes a transition of the data set ready signal, these above discussed operations are again repeated. Scanning modes other than scanning mode [5] allow different signals (e.g., other than DSR) to be used.

The above describes the operation when the system is commanded to the second mode in auto operation. This command to mode 2 occurs based on a command from the host side terminal, host computer 2. However, when auto/manual switch 33 is in manual position, the second mode can similarly be commanded. In order to command second mode when switch 33 is in manual position, the auto/manual switch 33 is manually operated to set the mode to manual and the commanding switches are set to mode [5]. This causes decoder 35 to output a polling mode signal (mode 5) to the scanning circuit 30 to begin the second operational mode.

Baud rate generator 32 is most advantageously embodied by a baud rate generator of the type which is manually externally selectable. These baud rate generators are known in the art. Baud rate generator 32 produces an output to command analyzer 31 and to scanning circuit 30 such that these circuits are synchronized with one another and synchronized with the communication speed of the system to which the device is connected. The command analyzing circuit 31 and scanning circuit 30 receive their clock signals and process the input signal. In this embodiment, the clock signals are preferably switchable within the range of 50 to 9600 baud.

A detailed description of the invention will now be provided herewith referring to FIGS. 3–8.

Figure 3:
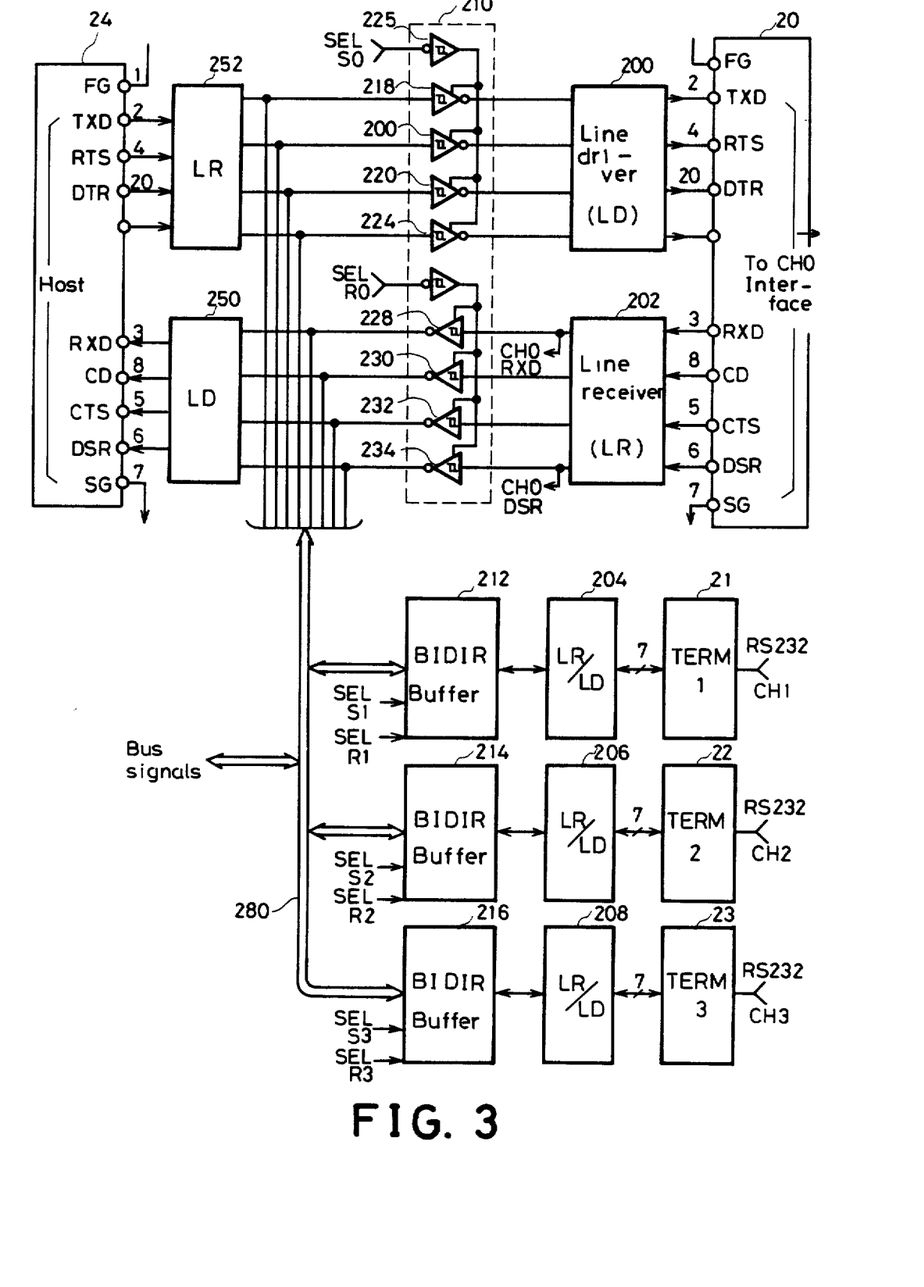
FIG. 3 shows a detailed block diagram-type schematic of the connection structures of the device of FIG. 2

FIG. 3 shows a detailed layout of channel circuits 20, 21, 22, 23, circuits 10–13, connecting circuit 7, host terminal circuit 14 and host side terminal 24.

Figure 4:
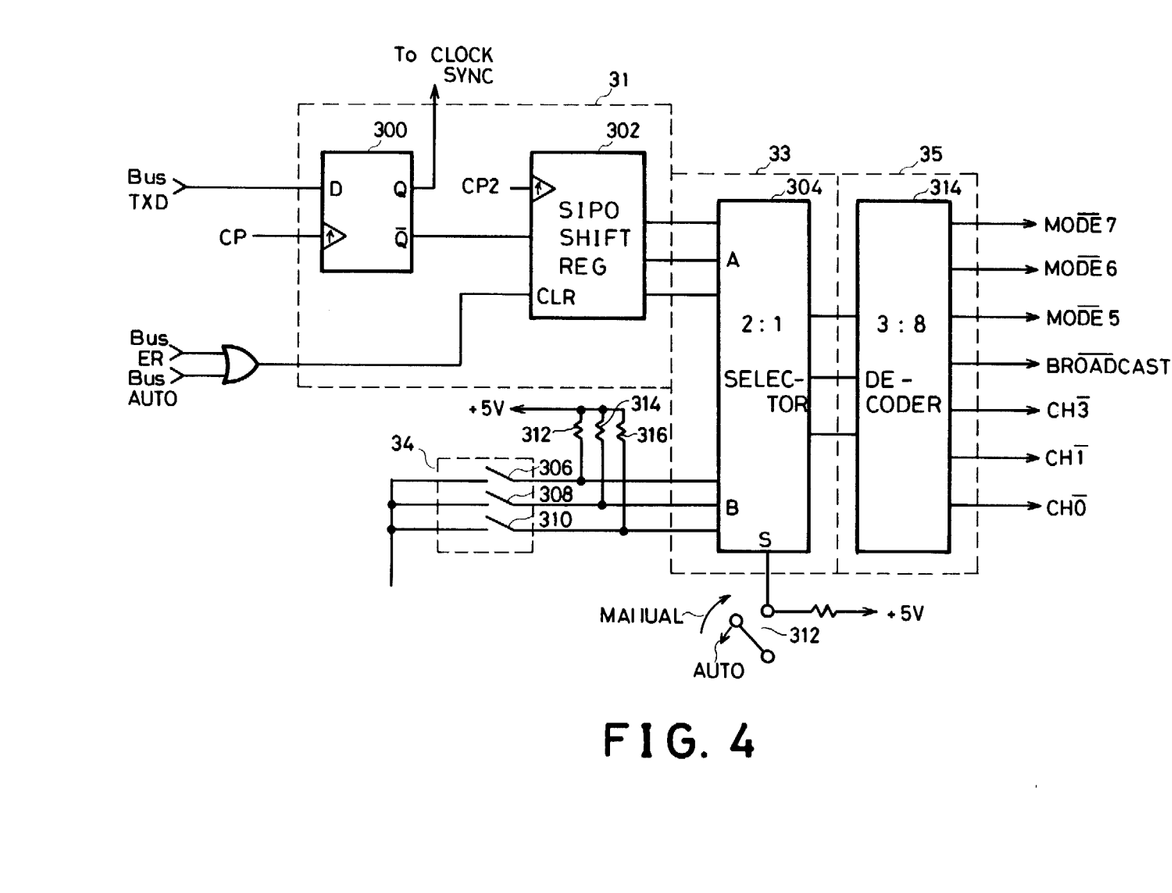
FIG. 4 shows a detailed schematic of the controlling devices to control connection in a first mode.

Channel terminal circuit 20 is shown in detail in FIG. 3. This channel circuit 20 is for channel 0 and includes the RS232 signals TXD, RTS, DTR, RXD, CD, CTS and DR, all discussed above. Terminals 21, 22 and 23 are all similar or exactly the same as channel circuit 20. However, for brevity and ease of understanding, circuits 21, 22 and 23 have merely been shown as a block indicated as a respective terminal. It should be understood by anyone reading this specification that channels 21, 22 and 23 are exactly the same as channel 20 which is shown in more detail. Similarly, the line driver/line receiver constituting channel circuit 10 for channel 0 is shown in more detail than those for the other channels. Line driver 200 is shown driving the TXD, RTS and DTR signals of the channel 0 interface. Line receiver 202 is shown as receiving the RXD, CD, CTS and DR signals. Similar structures for channels 1, 2 and 3 exist, but these are merely shown in block diagram 4 by line driver/lie receiver pairs 204, 206 and 208, respectively.

Any appropriate line driver or line receiver could be used. In this embodiment, all line drivers used are the Texas Instruments No. SN75188. All line receivers used are the Texas Instrument type SN75189.

The line driver 200 and line driver 202 are respectively connected to bidirectional data buffer 204. In keeping with continuity of this description, bidirectional buffer 204 is shown in detail for channel 0. Bidirectional buffers 212, 214 and 216 are shown in block diagram form, it being understood that these buffers ar exactly the same as the one shown in detail as element 210. Bidirectional buffer 210 includes a plurality of receivers, outputs of which drive line driver 200. These receivers 218, 220, 222 and 224 are all controlled by selector S0 line 226. Drivers 228, 230, 232 and 234 are all controlled by line 236-select R0.

Bidirectional driver 210, in this embodiment, is a tri-state driver of the '244 family, e.g., a 74LS244. Select S0 line 226 is a negative enable in this type of device. That is, when select line 226 is high, drivers 218, 220, 222 and 224 are all in the "tri-state" condition. This tri-state condition produces a high output impedance output. This enables the outputs of tri-state gates to be wire OR'ed together. When select line 226 goes low, gates 218, 220, 222 and 224 begin operating normally and amplify a signal therethrough.

Gates 228, 230, 232 and 234 operate in a similar way. A low on select R0 line 236 causes these gates to come out of tri-state and begin conducting signals indicative of their inputs.

As can be seen, all of these signals are wire OR'ed together such that each RS232 signal coming to the input of gate 218 similarly goes to the first gate input on drivers in buffers 212, 214 and 216. Therefore, the TXD signal from host terminal circuit 24 is connected to all of gates 210, 212, 214 and 216.

Similarly, the output of gate 228 is connected to the RXD signal of the host. This output is wire OR'ed with corresponding outputs from buffers 212, 214, and 216.

The output of buffers 228, 230, 232 and 234, as well as the outputs from buffers 212, 214 and 216 are connected into line driver circuit 250. Line driver circuit 250 drives the RXD, CD, CTS and DR signals of the host terminal circuit 24. The inputs from host terminal 24 are connected to line receiver 252 which produces a TTL-level output signal which is connected to receivers 218, 220, 222 and 224 of bidirectional buffer 210 as well as to corresponding receivers of bidirectional buffers 212, 214 and 216.

Bidirectional buffer 212 includes lines S1 and R1 as enable signals thereto. Similarly, bidirectional buffer 214 includes corresponding S2, R2 signals and bidirectional buffer 216 includes corresponding S3, R3 signals. It can easily be seen that the function of the switching circuit is performed by bidirectional buffer array 210, 212, 214, 216. By enabling a respective bidirectional buffer, that buffer connects its associated channel to the host channel. For instance, by enabling buffer 216, channel 3 is connected to host channel. Therefore, the switching function is performed based on control signals S0,R0–S3,R3.

FIG. 4 shows a detailed layout of the structure embodying command analyzer 32, auto/manual circuit 33, channel select 34 and decoder 35. The signal bus TXD, which is the transmit data signal of the RS232 signal that is on bus 280 shown in FIG. 3 at any given time, is coupled to the D input of a D type flip flop 300. A system clock pulse CP is applied to the clock input of this D flip flop. Therefore, D flip flop 300 performs the function of synchronizing the transmit data with the system clock. The output of D flip flop 300 is connected to a serial input of a serial-input, parallel-output (SIPO) shift register 302. This shift register receives a serial input and clocks this input in using clock pulse CP2. Parallel format data of three bits in length is produced at the outputs of SIPO 302. These outputs are coupled to inputs A of a two to-one data selector 304. 2-1 selector 304 has the function of receiving a multi-bit input at two different inputs and producing one output corresponding to one of these inputs. The one of these signals that is produced is based on a control signal. In this case, the commanded data from the transmit data line of the RS232 signal is received at input A.

Input B receives signals from channel select circuit 34. Channel select circuit 34 comprises three manually operable switches 306, 308, and 310. These switches include pull-up resistors 12, 314 and 316, each connected to 5 volts. When the switches are open, therefore, a 5-volt signal is routed to the respective B inputs of 2-1- selector 304. However, closure of the respective switches connects these switches to a ground, therefore producing a zero input to the B input of 2-1 selector 304. The selection between A and B of 2-1 selector 304 is accomplished by auto/manual mode commanding switch 312, connected to the S input of 2-1 selector 304. This S input receives either a zero or a one depending upon the switch position.

The output of 2-1 selector 304 is connected to three-to-eight decoder 314. This structure has a function of receiving the 3-bit input selected by 2-1 selector, and producing 8 outputs indicative of the encoded information. These outputs operate to control the mode of the system as commanded by either the TXD signal of the RS232, or from the manual command of manual command switch 34.

As can be appreciated by one having ordinary skill in the art, D flip flop 300 and SIPO 302 comprise together the command analyzer 31. Two to one selector 304 comprises auto/manual switch 33. 3–8 decoder 314 comprises decoder 35. In the preferred embodiment of this invention, D type flip flop 300 is embodied by an SN74LS74 type D flip flop. SIPO shift register 302 is embodied by an SN74LS164 shift register. Two to one selector 304 is embodied by a 74LS158 type two to one selector. Three to eight decoder 35 is embodied by Texas Instruments No. SN74LS156 type decoder. Of course, those having ordinary skill in the art could easily substitute other equivalent type integrated circuits or discrete logic.

Figure 5:
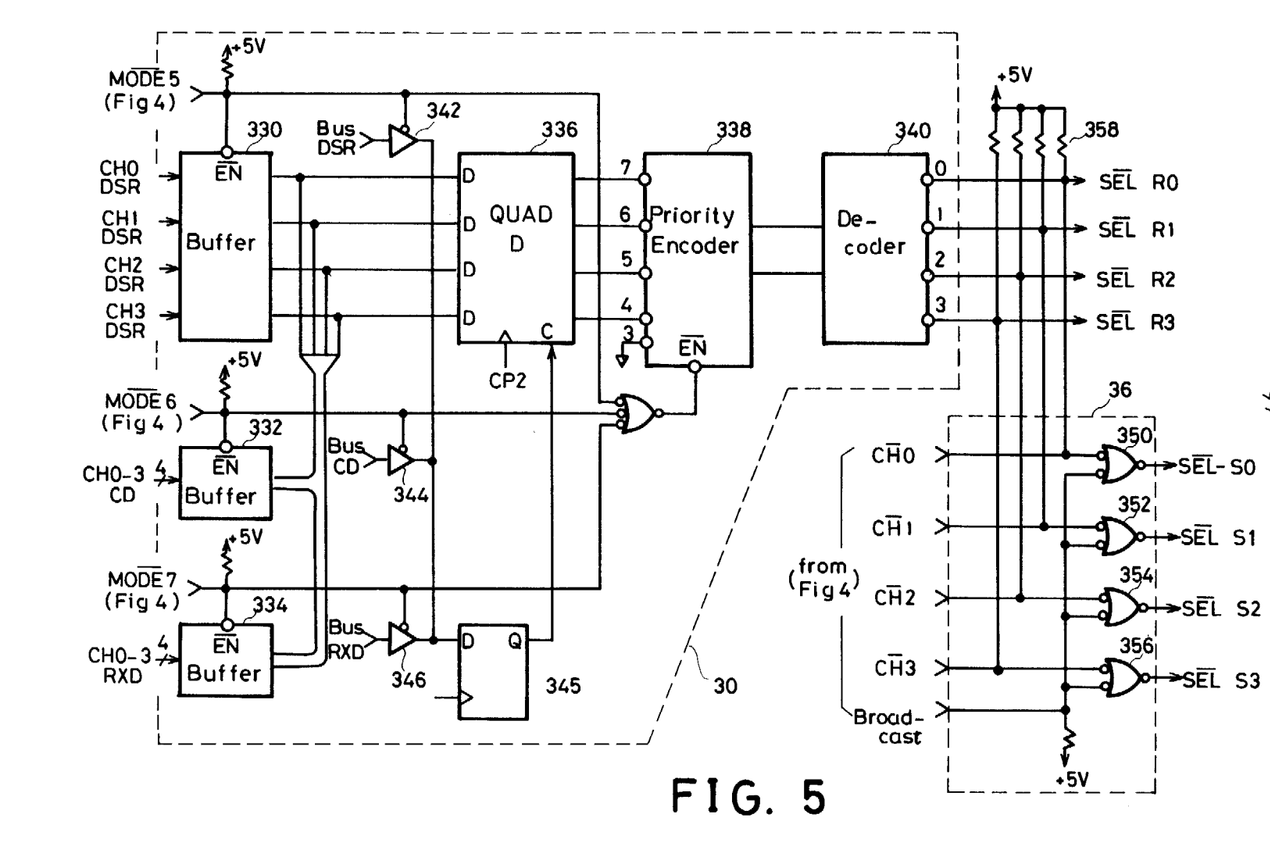
FIG. 5 shows the scanning circuit which controls the device in the second mode and also shows the control for the connecting circuit.

FIG. 5 shows a detailed layout of scanning circuit 30 and OR gate circuit 36.

Scanning circuit 30 receives the mode 5, mode 6 and mode 7 signals from the output of 3–8 decoder 314 in FIG. 4. These signals are used as enable signals for a plurality of buffers 330, 332 and 334. A 3–8 decoder circuit will only produce one of these outputs at any given time. Therefore, only one of these tri-state type buffers will be brought into conduction at any given time. The buffer that is commanded will determine the mode in which the system operates.

In this embodiment, mode 5 commands the scanning circuit 30, to search for transitions in the data set ready (DSR) signals coming from the respective output devices by enabling buffer 330. A data set ready signal becoming active on one of the output devices indicates a request from this device to obtain access.

In an analogous way, mode 6 indicates that the scanning circuit 30 should search for carrier detect (CD) signals from the respective output devices. Mode 7 indicates that the circuit should search for transitions in the receive data (RXD) output. To effect this function, a plurality of tri-state buffers 330, 332 and 334 are provided. Tri-state buffer receives channels 0-3 data set ready signals. When the system is in mode 5, tri-state buffer 330 is enabled, and any transition on the data set ready signals will be coupled through the buffer. Similarly, in mode 6, transitions in the carrier detect will be coupled through buffer 332 and in mode 7 transitions in the receive data will be coupled through buffer 334.

The outputs of all the buffers are wire OR'ed together at their output and are connected to a quad D type flip flop 336. This D flip flop performs the function of synchronizing the output of buffers 330, 332, 334 with clock pulse CP2.

The output of quad D flip flop 336 is coupled to the four highest inputs of a priority encoder 338. In this embodiment, this connection is made such that channel 0 has the highest priority with channel 3 having the lowest priority. However, any alternative combinations could be used depending on the desired priority. The lowest order inputs to the priority encoder are connected to ground.

A priority encoder functions to prioritize inputs to ensure that only the highest order input is encoded. That is, if any of inputs 0-7 are active, this input will be coded into a 3-bit output indicative of the active input. However, if two of the inputs are active, only the higher order input will be encoded and the lower order input will be ignored. This is used in this embodiment so that only one input is encoded. Users can typically assign a priority to the peripheral devices, indicative of the peripheral device which is most important. The priority encoder will ensure that this peripheral device will receive priority over other peripheral devices except when the device is occupied.

The output of priority encoder 338 is coupled to the input of decoder 340. Decoder 340 produces a discrete output signal corresponding to the coded input received from priority encoder 338. These output signals are used to select the respective buffers shown in FIG. 3. For instance, select R0 selects gates 228, 230, 232 and 234 of buffer 210 to receive information from the channel 0 interface. Select R1 selects the channel 1 receive interface, select R2 selects channel 2 receive interface, and select R3 selects the channel 3 receive interface.

The system also includes an override for the bus signal information. For instance, tri-state buffer 342 is provided with its input of buffer 342 connected to the bus data set ready signal. If the buffer is enabled, a transition on the bus DSR signal to active causes an input to the D flip flop 344. The output of D flip flop 344 produces an output which clears the D flip flop 336. Similarly, tri-state buffers for the carrier detect signal and the receive data signal, 344 and 346 are also provided.

In operation, a command of mode 5 causes scanning circuit 30 to search for data set ready transitions on any of channels 0-3 by enabling buffer 330. Initiation of mode 6 causes a search for any transition in the carrier detect signal. Therefore, either mode 5 or mode 6 can be used to detect transitions in the standard control signals.

Mode 7 is a special mode that detects a transition of the receive data signal. Any time an external peripheral device is communicating, it will cause transitions on the receive data signal. Therefore, in mode 7, any time the external device attempts to communicate, it will cause the scanning circuit to select that particular peripheral device when communication pauses, a timer starts. When the timer times out, it is turned off.

FIG. 5 also shows wired OR circuit 36 in detail and its connection, and shows the connection between the channel selecting signal CH0-CH3 and the broadcast and the select signals. Wired OR circuit 36 is comprised of a plurality of wired-OR connections, and has negative-NOR gates (embodied as AND gates) 350, 352, 354 and 356 for broadcasting.

The outputs of decoder 340 is wire OR'ed with the channel 0/channel 1/channel 2/ channel 3 signals such that the channel 0 output from decoder 340 is OR'ed with the channel 0 command from 3-8 decoder 314. Both of devices and 340 and 314 are "open collector" type devices. Accordingly, a plurality of pull-up resistors 358 are shown. When either of decoder output 0 or channel 0 signal from 3-8 decoder 314 becomes active, (low), it produces a low to the negative OR gate 350. This accordingly produces a low output for select S0 signal. Select S0 is used to enable half of bidirectional buffer 210 to enable signals from the host to be coupled to the channel 0 interface. Since wire or combination of the the channel 0 signal from 3:8 decoder 314 of FIG. 4 and the 0 output of decoder 340 is corrected to the select R0 signal 236, the other half of this bidirectional buffer is also enabled, enabling signals from the channel 0 interface to be coupled to the host interface.

In a similar way, channel 1, channel 2 and channel 3 are enabled by the respective channel 1, channel 2 and channel 3 signals.

This embodiment also includes a broadcast mode signal. This broadcast mode signal enables the commands from host terminal 24 to be connected to all of the channel interfaces 0-3. In this way, commands from host 24 can be connected to all of channel 0 interface 20, channel 1 interface 21, channel 2 interface 22 and channel 3 interface 23. This broadcast mode is mode 4 from the 3-8 decoder 314 and is shown connected to the other input of each of the negative NOR gates 350, 352, 354 and 356. In this way, when broadcast signal becomes active (low), all of select S0, select S1, select S2 and select S3 signals will go active, enabling half of each buffer 210, 212, 214 and 216. In this way, the signals TXD, RTS and DTR from the host will be connected to all of the corresponding terminals on all of the channel interfaces.

In this embodiment, buffers 330, 332 and 334 in FIG. 5 are embodied by a Texas Instruments No. SN74LS244 octal buffer. Buffers 342, 344 and 346 are embodied by an SN74LS125. The quad D type flip flop 336 is embodied by an SN74LS175. D type flip flop 345 is embodied by an SN74LS74. Priority encoder 338 is embodied by an SN74LS148. Decoder 340 is embodied by an SN74LS156. The negative OR gates are embodied by SN74LS08. Of course, those having ordinary skill in the art would easily be able to use different circuits, and the above given examples are merely exemplary of what those of ordinary skill in the art would use.

Figure 6:
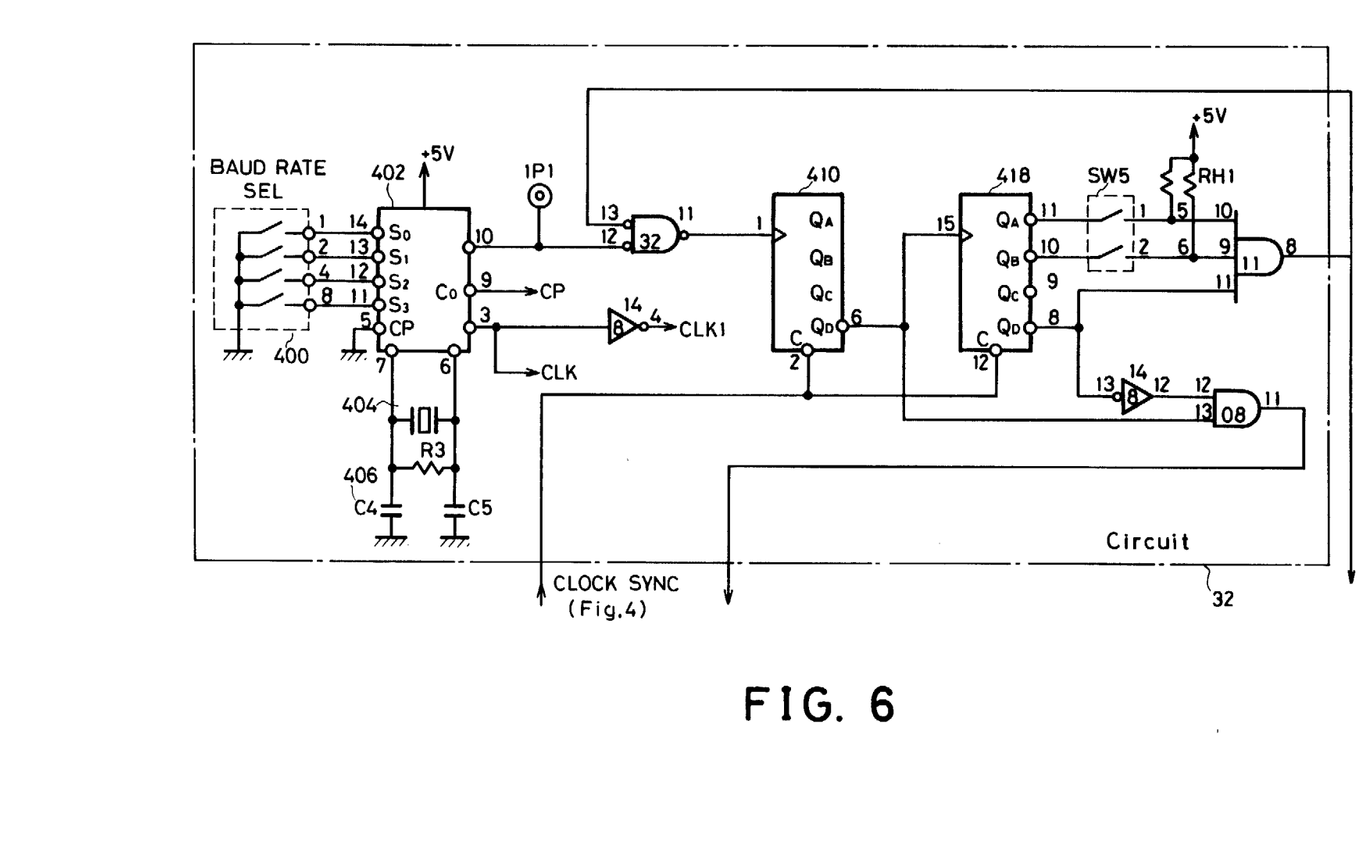
FIG. 6 shows a baud rate generator producing a clock for the system.

FIG. 6 shows the baud rate selector which produces the clock for this embodiment. Baud rate selector switch 400 is shown connected to clock generator IC402. In this embodiment, clock generator IC402 is an IM4702. This clock generator is also connected to an appropriate crystal 404 as well as resistor capacitor network 406. The output of this clock generator is connected to produce the clock signals CLK, CLK1 and CP. In addition, the remaining clock signals are produced using binary counters 410 and 412. These binary counters are of the 74LS393 types, being four bit counters. Accordingly, counter 410 is configured as a divide by 16 counter, while counter 412 is configured as a programmable divide by N counter.

Those having ordinary skill in the art would certainly understand that many other clocking situations are possible. In addition, the detailed layout of the clocking for this circuit has not been disclosed herein, as those having ordinary skill in the art would certainly understand how such detailed clocking would be performed.

Figure 7:
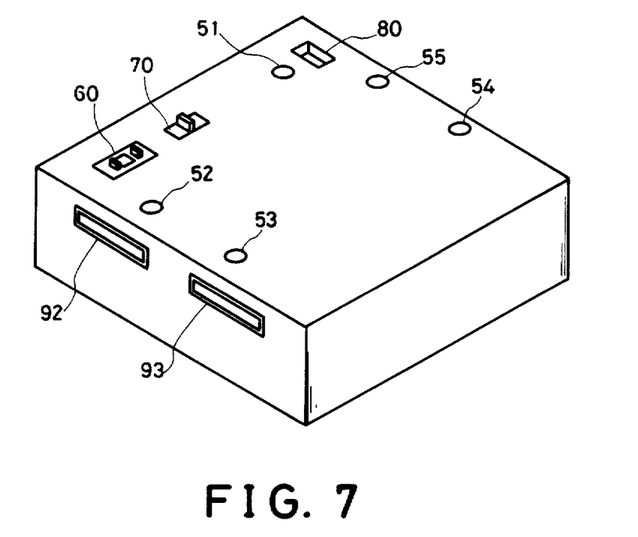
FIG. 7 shows a perspective view of an embodiment of the casing of the present invention.
Figure 8:
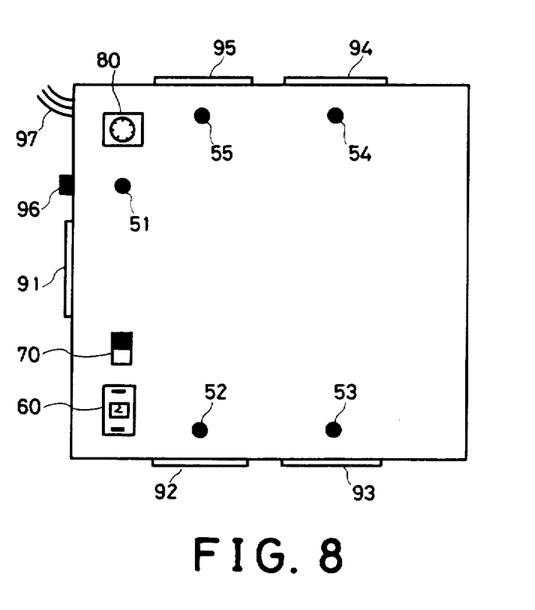
FIG. 8 shows a plane view of this casing.

FIG. 7 shows a perspective view of an embodiment of a casing box according to the present invention with FIG. 8 showing a plane view thereof. The box includes power source light 51, selected channel display lights 52, 53, 54, 55, baud rate selector switch 60, automatic/manual switch 70, and channel selection switch 80. On the side thereof are mounted a host side terminal 91 and four channel side terminals 92, 93, 94, 95. A power source switch 96 is also mounted. A power source cord 97 is attached to the side of the device. As shown in FIGS. 7 and 8, this device can be easily produced as a relatively small and compact system.

Although only a few exemplary embodiments of this invention have been described in detail above, those skilled in the art will readily appreciate that many modifications are possible in the exemplary embodiments without materially departing from the novel teachings and advantages of this invention. For instance, although the above description shows the number of terminals on the channel side as being four, this number can be any plural number. In addition, although the above logic is described as being implemented in TTL logic circuitry, any other logic circuitry, or in fact discrete components can be used. While a personal computer is described as being connected to the host side, with peripheral devices which are typically passive being connected to the channel side, the passive devices may also be connected to the host side and the computer or other active devices connected to the channel side. Furthermore, request to send (RTS) can be used in place of the data terminal ready (DTR) signals. Alternately, an AND logical operation between the request to send and data terminal ready signals could be used for a similar effect. Furthermore, the carrier detect (CD) signals could be used in this system in place of the data set ready signals. An AND of this combination could also be used.

Accordingly, all such modifications are intended to be included within the scope of this invention a defined in the following claims.

What is claimed is:

1. A selector switch box comprising:
   a single box;
   a first terminal, contained within said single box, configured as an RS232C interface and adapted to receive an RS232 signal including a plurality of signals;
   a plurality of second terminals, contained within said single box, all configured as RS232C interfaces adapted to receive RS232 signals, each having a plurality of signals;
   switching means, contained within said single box, for selectively connecting each of the signals of said first terminal with at least one corresponding signals of said second terminals in response to a switching command;
   command analyzing means, contained within said single box, coupled to a ready signal which includes at least one of the data terminal ready signal or the request to send signal of the RS232 signal on said first terminal, and to a transmit data signal of said RS232 signal on said first terminal, for analyzing transmit data contained in said RS232 signal immediately after a level transition of said ready signal, and for producing one of a channel designation number and a polling mode number indicative of said data as an output signal;
   decoder means, contained within said single box, for translating said output signal from said command analyzing means into one of a channel switching output which identifies a channel to be switched and a polling mode signal which identifies a polling mode;
   scanning means, contained within said single box, activated in response to said polling mode signal from said decoder means, coupled to input a detect signal which includes at least one of a data set ready signal, a carrier detect signal, or a receive data signal from the RS232 signals on at least one of said second terminals and identifying at least one channel where said detect signal changes state, and for transmitting a channel switching output which designates said channel; and
   means for selectively feeding one of said channel switching signal outputs from said decoder means, and the channel switching signal output from said scanning means, to the control input of said switching means as said switching command.

2. A box as in claim 1 further comprising baud rate generator means for providing clock signals to said command analyzing means and to said scanning means.

3. A selector switch box as in claim 1 wherein said scanning means includes a priority encoder device for choosing a highest order among those of said detect signals which have changed state.

4. A selector switch box as in claim 3 wherein said switching means is comprised of a plurality of tri-state type buffers.

5. A device as in claim 4 wherein said command analyzing means includes serial to parallel converter means for converting said transmit data signal which is a serial signal to a parallel output.

6. A box as in claim 5 wherein decoder means is a decoder for translating said parallel signal into a plurality of command signals.

7. A box as in claim 6 wherein said selectively feeding means is a wired-OR connection.

8. A selector switch box comprising:
   a first terminal configured as an RS232C interface including a plurality of signals;
   a plurality of second terminals, all configured as RS232C interfaces, each having a plurality of signals;

switching means for selectively connecting each of the signals of said first terminal to at least one corresponding signal of said second terminals in response to a switching command;

command analyzing means, coupled to a ready signal which includes at least one of the data terminal ready signal or the request to send signal of the RS232 signal on said first terminal and to a transmit data signal of said RS232 signal on said first terminal, for analyzing transmit data contained in said transmit data signal immediately after a level transition of said ready signal, and for producing at least one of a channel designation number and a polling mode number indicative of said data as an output signal;

decoder means for translating said output signal indicative of the channel designation number from said command analyzing means into one of a channel switching output which identifies a channel to be switched and for translating said output signal related to a polling mode signal which identifies a polling mode;

scanning means, activated in response to said polling mode signal from said decoder means, coupled to input a detect signal which includes at least one of a data set ready signal, a carrier detect or a receive data signal from the RS232 signals on at least one of said second terminals, for identifying at least one channel where said detect signal changes state and transmitting a channel switching signal which designates said channel;

automatic/manual switching means, provided between the output signal of said command analyzing means and said decoder means, for receiving a manual switch command including an auto/manual mode and a manual channel designation and producing an output based on said channel switching output in response to said manual switch command, and for producing an output indicative of said output from said command analyzing means in the automatic mode; and means for selectively feeding one of said channel switching output from said decoder means or the channel switching signal output from said scanning means to the control input of said switching means as said switching command;

wherein all of said circuits are packaged in one single box.

9. A selector switch box as in claim 8 wherein said scanning means includes a priority encoder device for choosing a highest order one among those of said detect signals which have changed state.

10. A selector switch box as in claim 9 wherein said switching means is comprised of a plurality of tri-state type buffers.

11. A device as in claim 10 wherein said command analyzing means includes serial to parallel converter means for converting said transmit data signal, which is a serial signal, to a parallel output.

12. A box as in claim 11 wherein decoder means is a decoder for translating said parallel signal into a plurality of command signals.

13. A box as in claim 12 wherein said selectively feeding means is an OR gate.

14. An apparatus as in claim 13 wherein said auto/-manual switching means is a data selector.

15. An apparatus as in claim 13 wherein said auto/-manual switching means includes a first manual switch for commanding auto/manual, a plurality of switches for commanding said channel switching output, and a data selector, responsive to select data based on said auto/manual switch for selecting one of said channel switching output for said manually commanded channel switching output.

16. An apparatus as in claim 8 wherein said auto/-manual switching means includes a first manual switch for commanding auto/manual, a plurality of switches for commanding said channel switching output, and a data selector, responsive to select data based on said auto/manual switch for selecting one of said channel switching output for said manually commanded channel switching output.

17. A box as in claim 15 wherein said first terminal, said second terminals, said switching means, said command analyzing means, said decoder means, said scanning means, said auto/manual switching means, and said selectively feeding means are all contained within a single box.

18. A box according to claim 8 wherein said first terminal, said second terminals, said switching means, said command analyzing means, said decoder means, said scanning means, said auto/manual switching means, and said selectively feeding means are all contained within a single box.

19. A selector switch box comprising:
a first terminal configured as an RS232C interface having a plurality of signals;
a plurality n of second terminals, all configured as RS232C interfaces, each having a plurality of signals;
switching means for connecting each of the signals of said first terminal to corresponding signals of said second terminals;
command analyzing means, coupled to a ready signal which includes at least one of a data terminal ready and a request to send signals of the RS232 signal on said first terminal and to transmit data signal, for analyzing said transmit data immediately after a level transition of said ready signal, to obtain a channel designation number and a polling mode number and producing an output signal indicative thereof;
baud rate generator means for providing clock signals to said command analyzing means;
decoder means for translating the output signal indicative of the channel designation number from said command analyzing means into a channel switching output which identifies said channel and for translating said output signal related to the polling mode number into a polling mode signal;
scanning means, activated subject to a completion of producing the polling mode signal by said decoder means, coupled to input a detect signal which includes at least one of a data set ready signal and a carrier detect signals from one of said second terminals and identifying a channel where said detect signal first changes state, and transmits a channel switching signal output which designates said channel;
wherein said channel switching signal output from said decoder means and the channel switching signal output from said scanning means can be selectively fed to the control input of said switching means;
and wherein all of said circuits are packaged on one single box.

20. A selector switch box comprising:
- a first terminal configured as an RS232C interface having a plurality of signals;
- a plurality of n of second terminals, all configured as RS232C interfaces, each having a plurality of signals;
- switching means for connecting each of the signals of said first terminal to corresponding signals of said second terminals;
- command analyzing means, coupled to a ready signal which includes at least one of a data terminal ready signal and a request to send signal of the RS232C signal on said first terminal and to a transmit data signal, for analyzing said transmit data signal immediately after a level transition of said ready signal, to obtain a channel designation number and a polling mode number and produce output signals indicative thereof;
- baud rate generator means for providing clock signals to said command analyzing means;
- decoder means for translating the output signal indicative of the channel designation number from said command analyzing means into a channel switching signal indicative thereof and for translating said output signal related to the polling mode number into a polling mode signal indicative thereof;
- scanning means, activated subject to the completion of producing the polling mode signal by said decoder means, coupled to input a detect signal which includes at least one of a data set ready signal and a carrier detect signals from one of said second terminals and identifying a channel where said detect signal first changes state and transmits a channel switching signal which designates said channel;
- automatic/manual switching means, provided between the output of said command analyzing means and said decoder means so that the switching circuit is manually and externally switchable;
- wherein said channel switching output from said decoder means and the channel switching signal output from said scanning means can be selectively fed to the control input of said switching means;
- wherein said switching means gives the output from said command analyzing means to said decoder means in the automatic mode while it gives the channel designation number and the polling mode number instead of the output from said command analyzing means to said decoder means in the manual mode, and wherein all of said circuits are packaged in one single box.

21. The selector switch box as claimed in claim 20 which is further provided with drivers/receivers at respective terminals of the first and the second terminals to amplify the signals of the necessary signal lines.

22. The selector switch box as claimed in claim 20 wherein the output frequency of the bond rate generator may be switchable from the outside.

* * * * *